United States Patent [19]

Iioka et al.

[11] Patent Number: 5,490,631
[45] Date of Patent: Feb. 13, 1996

[54] HEAT-INSULATING PAPER CONTAINER AND METHOD FOR PRODUCING THE SAME

[75] Inventors: Akira Iioka; Kenji Ishii, both of Chiba; Yasushi Oguma, Misato, all of Japan

[73] Assignee: Nihon Dixie Company Limited, Tokyo, Japan

[21] Appl. No.: 358,761

[22] Filed: Dec. 19, 1994

[30] Foreign Application Priority Data

Dec. 22, 1993 [JP] Japan ................................. 5-346302
Oct. 25, 1994 [JP] Japan ................................. 6-284125

[51] Int. Cl.⁶ ........................................... B65D 3/22
[52] U.S. Cl. ...................... 229/403; 264/46.4; 264/134; 493/53; 493/149; 493/903
[58] Field of Search .................... 229/403, 400; 220/417, 450, 454, 455, 457, 444; 493/903, 149, 53; 264/53, 134, 46.4, 46.7, 46.9

[56] References Cited

U.S. PATENT DOCUMENTS

| | | | |
|---|---|---|---|
| 3,049,277 | 8/1962 | Shappell | 229/403 |
| 3,126,139 | 3/1964 | Schechter | 229/403 |
| 3,226,000 | 12/1965 | Poole et al. | 229/400 |
| 3,262,625 | 7/1966 | Russell et al. | 229/403 |
| 3,299,914 | 1/1967 | Harmon | 229/400 X |
| 3,329,306 | 7/1967 | Stein | 229/403 |
| 3,374,922 | 3/1968 | Shelby | 229/400 X |
| 3,471,075 | 10/1969 | Wolf | 229/400 |
| 3,976,795 | 8/1976 | Ando | 229/403 X |
| 4,435,344 | 3/1984 | Iioka | |
| 4,965,029 | 10/1990 | Lidy et al. | 264/46.4 X |
| 4,975,117 | 12/1990 | Tabayashi et al. | 106/22 |

FOREIGN PATENT DOCUMENTS

| | | |
|---|---|---|
| 48-32283 | 10/1973 | Japan . |
| 57-110439 | 7/1982 | Japan . |
| 6-99967 | 4/1994 | Japan . |

*Primary Examiner*—Allan N. Shoap
*Assistant Examiner*—Christopher McDonald
*Attorney, Agent, or Firm*—Fay, Sharpe, Beall, Fagan, Minnich & McKee

[57] ABSTRACT

A heat-insulating paper container comprising a body member and a bottom panel member, part of the outer surface of said body member being provided with printing of an organic solvent based ink, wherein a thick foamed heat-insulating layer that is made of a thermoplastic synthetic resin film is formed in the printed area of said outer surface whereas a less thick foamed heat-insulating layer that is made of the same thermoplastic synthetic resin film is formed in the non-printed area of said outer surface. If desired, part of the thermoplastic synthetic resin film may be adapted to remain totally unfoamed.

15 Claims, 6 Drawing Sheets

HEAT-INSULATING PAPER CONTAINER AND METHOD FOR PRODUCING THE SAME

BACKGROUND OF THE INVENTION

This invention relates to a heat-insulating paper container having a foamed layer of a thermoplastic synthetic resin film on the outer wall surface of the body member. More particularly, the invention relates to a paper container in which the thickness of the foamed heat-insulating layer in one area differs from that in another area.

Several types of heat-insulating containers have been used commercially to pack hot liquids. A polystyrene foam heat-insulating container is one example. This is produced by a process comprising the addition of a foaming agent to polystyrene, casting the mixture into a mold, heating the resin under pressure to foam it, and removing the shaped article from the mold. The container thus produced has outstanding heat-insulating properties but, on the other hand, it needs reconsiderations from the viewpoint of saving petroleum resources or increasing the efficiency of incinerating waste containers. As a further problem, a curved printing press or a stamp printing press is required to print on the outer surfaces of polystyrene foam heat-insulating containers since printing can only be effected after individual cups have been shaped. Thus, the polystyrene foam containers have suffered the disadvantage of low printability.

Another type of heat-insulating paper containers are such that the outer side wall of the body member is entirely surrounded by a corrugated paper jacket. The process of manufacturing such container involves additional steps of forming the corrugated paper jacket and bonding it to the outer surface of the side wall of the body member. This type of containers have various other defects. First, letters, figures or other symbols are printed on the corrugated surface and the resulting deformed letters or patterns do not have good aesthetic appeal to consumers. Secondly, the jacket is bonded to the side wall of the body member in such a manner that only the valley ridges contact the side wall and the bond between the jacket and the side wall is so weak that the two will easily separate. Thirdly, containers having the corrugated jacket are not suitable for nesting and, hence, need a large area of storage.

Still another type of heat-insulating paper containers have a "dual structure" wherein an inner cup is given a different taper than an outer cup to form a heat-insulating air layer in the space between the two cups. The two cups are made integral by curling their respective upper edges into a brim. Containers of this type have very good printability since the outer cup has a smooth-surfaced outer side wall. On the other hand, the two cups are prone to separation. A further defect is that the dual structure generally contributes to high manufacturing cost.

Unexamined Published Japanese Patent Application (kokai) Sho 57-110439 teaches a heat-insulating paper container consisting of a body member and a bottom panel member, characterized in that at least one surface of the body member is coated or laminated with a foamed heat-insulating layer of a thermoplastic synthetic resin film whereas the other surface of the body member is coated or laminated with a thermoplastic synthetic resin film, a foamed heat-insulating layer of said thermoplastic synthetic resin film or an aluminum foil. As already taught by Examined Japanese Patent Publication (kokoku) Sho 48-32283, the water in the paper is vaporized upon heating, causing the thermoplastic synthetic resin film on the surface to foam. The container under consideration has the advantage that it exhibits fairly good heat-insulating property and that it can be manufactured at low cost by a simple process.

This approach, however, has its own limitations; first, the thermoplastic synthetic resin film will not foam adequately if the water content in the paper is low; second, high water content is advantageous for the purpose of film foaming but, on the other hand, the mechanical strength of the container may deteriorate; thirdly, even if successful foaming is done, the thickness of the foam layer is uniform and cannot be adjusted from one portion to another.

SUMMARY OF THE INVENTION

An object, therefore, of the present invention is to provide a heat-insulating paper container having a foamed layer that differs in thickness from one portion to another.

This object of the invention can be attained by a heat-insulating paper container comprising a body member and a bottom panel member, characterized in that part of the outer surface of said body member is provided with printing of an organic solvent based ink, wherein a thick foamed heat-insulating layer that is made of a thermoplastic synthetic resin film is formed in the printed area of said outer surface whereas a less thick foamed heat-insulating layer that is made of the same thermoplastic synthetic resin film is formed in the non-printed area of said outer surface.

The most characterizing portion of the invention is that the heat-insulating paper container has a thick foamed heat-insulating layer in that area of the outer surface of the body member which has been provided with printing of an organic solvent based ink whereas a less thick foamed heat-insulating layer is formed in the non-printed area of said outer surface. The formation of the thick foamed heat-insulating layer would be explained as follows: the residual solvent or solvents in the printing ink and other ink components such as pigment combine to lower the strength of adhesion of the thermoplastic synthetic resin film to the paper sheet, whereupon the film in the printed area is foamed at an accelerated rate to form a thick foamed heat-insulating layer. As a matter of fact, the experiment conducted by the present inventors showed that the film in printed areas having adhesive strengths of 10–50 gf foamed to a thickness about 3 times as great as the film that foamed in non-printed areas having adhesive strengths of 200 gf or more.

When holding paper containers by hand, most users put fingers just under the brim; therefore, the thick foamed layer which is formed in the upper half of the container body member will ensure more effective heat insulation than the conventional versions.

BRIEF DESCRIPTION OF THE DRAWINGS

FIG. 3a–3c show schematically a process step for forming the unfoamed area shown in FIG. 2, in which FIG. 3a shows part of the turntable as a component of a cup-forming machine, FIG. 3b shows an inverting section with which each of the shaped containers is picked up from the turntable in the cup-forming machine and transferred to another turntable which is a component of a slitting machine, and FIG. 3c shows part of the turntable in the slitting machine;

DETAILED DESCRIPTION OF THE INVENTION

The present invention will now be described in greater detail with reference to the accompanying drawings.

Figure 1:
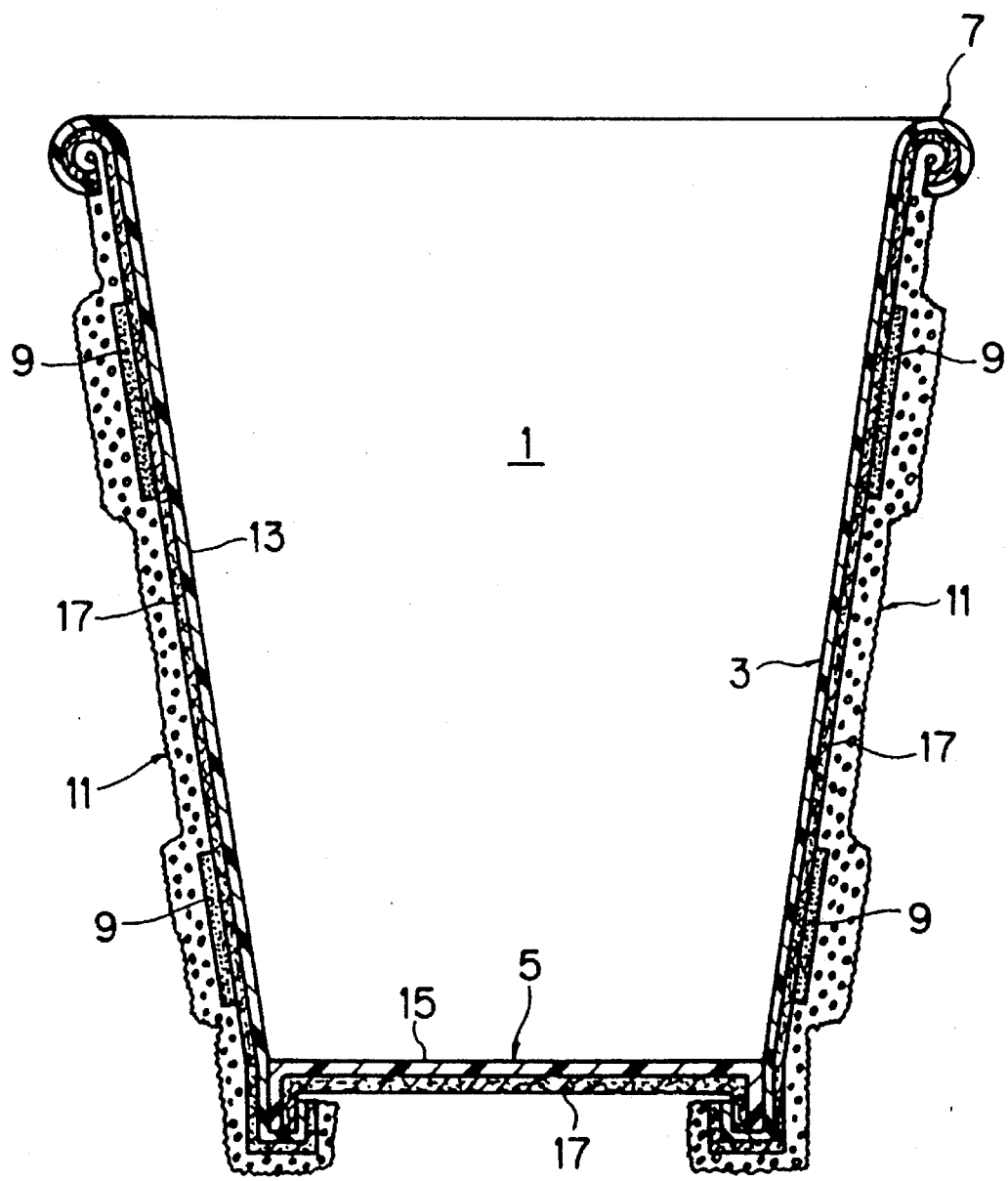
FIG. 1 is a simplified cross section of an example of the heat-insulating paper container of the invention.

FIG. 1 is a simplified cross section of an example of the heat-insulating paper container of the invention. The container generally indicated by 1 consists basically of a body member 3 and a bottom panel member 5. The body member 3 has a printed area 9 provided on the outer surface by an organic solvent based ink near the brim 7 and the bottom panel member 5. The body member 3 also has a foamed heat-insulating layer 11 which entirely covers its outer surface including the printed areas 9. As shown in FIG. 1, the foamed heat-insulating layer 11 over the printed areas 9 is thicker than the foamed heat-insulating layer 11 over the non-printed areas. The foamed heat-insulating layer 11 may typically be formed of a thermoplastic synthetic resin such as polyethylene.

The inner surface of the body member 3 is covered with a film 13 which is made of either a thermoplastic synthetic resin such as polyethylene or an aluminum foil. The inner lining of the body member 3 is necessary both for preventing the penetration of liquid contents into the paper and for assuring that the water in the paper will not evaporate directly into the air atmosphere during heating of the fabricated container. Total loss of the water in the paper may potentially result in a failure to foam the thermoplastic synthetic resin film on the outer surface of the body member 3. The inner surface of the bottom panel member 5 is laminated with a thermoplastic synthetic resin film 15 to attain the same purpose as just described above (preventing the permeation of liquids into the paper). Indicated by 17 is the paper sheet.

The heat-insulating container of the invention can be fabricated by means of a conventional cup-forming machine. First, a paper sheet for making the container body member is unrolled and subjected to printing in desired areas. Registering and other necessary printing jobs can be done by conventional means or procedures. In the next step, the thusly printed paper sheet is extrusion-laminated with a film of thermoplastic synthetic resin such as polyethylene. The other side (where no printing has been done) of the paper sheet is also laminated with a thermoplastic synthetic resin film or an aluminum foil. A paper sheet for making the bottom panel member is laminated with a thermoplastic synthetic resin film on one side only. A blank is cut from each of the paper sheets. Using a conventional cup-forming machine, the two blanks are fabricated into a container with the blank for the body member being oriented in such a way that the printed areas will face outward whereas the blank for the bottom panel member is oriented in such a way that the film laminated side will face inward. The fabricated container is then subjected to a heat treatment.

The positions of the printed areas to be formed on the blank for the body member are not limited in any particular way. They may cover all outer surfaces of the body member 3; alternatively, they may be formed in one or more positions where users are most likely to put fingers for holding the container (see FIG. 1). Printing may be done by overall printing or by usual pattern printing. The printed areas are preferably formed continuously on the circumference of the body member 3.

The ink to be used in printing is not limited to any particular types but inks of such a type that very small amounts of solvent components will remain in the printed surface (more specifically, the paper) are preferred from the viewpoint of accelerated film foaming. Common ink solvents such as acetone, ethyl acetate, methanol, isopropyl alcohol, ethanol, toluene, xylene, methyl ethyl ketone, methyl isobutyl ketone, butanol, propylene glycol, monomethyl ether acetate, ethyl cellosolve, etc. may be used in admixture. To insure efficient foaming, small amounts of ink solvents should remain even after both surfaces of the body member have been laminated with thermoplastic synthetic resin films. Desirable from this viewpoint are inks that contain large amounts of toluene, methyl ethyl ketone, methyl isobutyl ketone and other solvents that are less prone to evaporation during drying on a printing press or at the stage of lamination with thermoplastic synthetic resin films. Such less vaporizing solvents are preferably contained in at least 10%, more preferably 20–50%. It should, however, be noted that the relative proportions of solvents must be determined in due consideration of printability since the ink containing those solvents is to be used for the printing purpose.

The residual solvents will contribute to enhanced foaming as a result of heating the shaped cup in an oven; at the same time, those solvents will be vaporized away by heating and the cup as the final product will have no odor reminiscent of the residual solvents. By way of example, preferred ranges of the residual amounts of solvents that remain before heat treatment are given below:

| toluene | $3 \times 10^{-6}$–$6 \times 10^{-6}$ g/m$^2$ |
| methyl ethyl ketone | $3 \times 10^{-6}$–$9 \times 10^{-6}$ g/m$^2$ |
| methyl isobutyl ketone | $2 \times 10^{-5}$–$6 \times 10^{-5}$ g/m$^2$ |

Excess amounts of residual solvents will attack the polyethylene film during heating, thereby impairing the external appearance of the foamed layer. They are also undesirable from a hygienic viewpoint since the cup as the final product has a lingering solvent odor.

An experiment was conducted to investigate the correlation between the amount of residual solvents in printed areas and the efficiency of foaming, using an ink containing a mixed solvent of methyl isobutyl ketone, methyl ethyl ketone and toluene. The experimental regime and results were as follows.

Layer arrangement: low-density polyethylene (LDPE: 40 μm thick)/ink/cup forming paper sheet (230 μm thick, with 7.9% water in the paper)/medium-density polyethylene (MDPE: 20 μm thick)

Total thickness: 0.31 mm

Heating conditions: 120° C.×120 sec

| Amount of residual solvent, g/m² | Thickness before foaming, mm | Thickness after foaming, mm |
|---|---|---|
| 0 | 0.31 | 0.70 |
| $3 \times 10^{-5}$ | 0.31 | 0.82 |
| $5 \times 10^{-5}$ | 0.31 | 0.95 |
| $7 \times 10^{-5}$ | 0.31 | 1.02 |

A similar experiment was conducted to investigate the correlation between the amount of residual solvents in printed areas and the efficiency of foaming, using an ink containing a mixed solvent of methyl ethyl ketone and toluene. The experimental regime and results were as follows.

Layer arrangement: LDPE (40 μm thick)/ink/cup forming paper sheet (230 μm thick, with 7.9% water in the paper)/MDPE (20 μm thick)
Total thickness: 0.31 mm
Heating conditions: 120° C.×120 sec

| Amount of residual solvent, g/m² | Thickness before foaming, mm | Thickness after foaming, mm |
|---|---|---|
| 0 | 0.31 | 0.72 |
| $8 \times 10^{-6}$ | 0.31 | 0.74 |
| $5 \times 10^{-6}$ | 0.31 | 0.77 |
| $1.5 \times 10^{-5}$ | 0.31 | 0.79 |

As one can see from these data, when the residual amounts of organic solvents in the as-printed areas were within the indicated ranges, there were no problems with the subsequent operation of lamination with polyethylene films or with the efficiency of cup shaping step, nor was there any odor problem due to the residual solvents. Hence, the solvent formulations set forth above are desirable. It should, however, be mentioned that other combinations of solvents are of course applicable.

A test was also conducted to compare the efficiency of foaming in printed areas with that of foaming in non-printed areas. Printing was done using an ink containing a mixed solvent of methyl isobutyl ketone, methyl ethyl ketone and toluene.

Layer arrangement: LDPE (40 μm thick)/ink (used only in the printed areas)/cup forming paper sheet (230 μm thick)/MDPE (20 μm thick)
Water in paper: 7.9%
Amount of residual solvents in printed areas: $4 \times 10^{-5}$ g/m²
Heating conditions: 120° C.×120 sec

| Total thickness: | Non-printed area | Printed area |
|---|---|---|
| Before heating | 0.31 mm | 0.31 mm |
| After heating | 0.68 mm | 0.90 mm |

The particle size of the pigment in ink is not limited to any particular value. With inorganic pigments, the range of 0.05–0.5 μm is preferred whereas the range of 0.01–0.05 μm is preferred for organic pigments. The larger the particle size, the greater the ease with which the bonding force can be controlled.

The resin which is the primary component of inks must be capable of assuring consisting strength of bond to the polyethylene which is to be extrusion-laminated on the printed surface. Common resin components of inks are rosin-modified maleic resins in the class of natural resins, as well as cellulose nitrate, cellulose acetate, polyamide resins chlorinated rubbers, vinyl chloride resins, acrylic resins, urethane resins, epoxy resins, etc. In consideration of the adhesion to polyethylene films and in view of the fact that desirable resins should soften to some extent during heating, vinyl chloride resins and urethane resins are particularly preferred.

Thermoplastic synthetic resin films that may be used in the invention are typically formed of polyethylenes, polypropylenes, polyvinyl chlorides, polystyrenes, polyesters, nylons, etc. The film to be laminated on the outer surface of the body member 3 must have a lower softening point than the film to be laminated on the inner surface. Take, for example, the case of laminating both sides of the body member 3 with a polyethylene film; the film on the outer surface must be a low-density polyethylene and the film on the inner surface must be a medium- or high-density polyethylene.

The thickness of the film to be laminated on the body member 3 is not limited to any particular values but it should preferably have the necessary and sufficient thickness to form a desired thickness of foamed heat-insulating layer 11 by foaming the film laminated on the outer surface of the body member. Take, for example, the case of laminating a low-density polyethylene film on the outer surface of the body member 3; the thickness of this film is typically in the range from 25 to 60 μm. Thicker films may be used but then the underlying printed patterns are sometimes difficult to see through the films. The thickness of the film to be laminated on the inner surface of the body member 3 is not limited to any particular values as long as it is necessary and sufficient to ensure resistance to liquid permeation. The exact value of the thickness that meets this requirement is variable and can appropriately be determined by the skilled artisan in accordance with the specific type of film that is selected for use.

The paper sheet to be used in producing the heat-insulating container of the invention has preferably a basis weight in the range from 100 g/m² to 400 g/m². It is also preferred that the paper sheet has a water content within the range from about 3% to about 10%.

The heating temperature and time will vary with the type of the paper sheet and the thermoplastic synthetic resin film used; generally, the heating temperature varies from about 110° C. to about 200° C. and the heating time varies from about 20 seconds to about 4 minutes. An optimal combination of heating temperature and time can appropriately be determined by the skilled artisan in accordance with the specific type of film used.

Any heating means such as hot air, electric heat or microwaves can be used. Heating by hot air or electric heat in a tunnel having transporting means such as a conveyor has the advantage of accomplishing mass production at low cost.

To produce the heat-insulating paper container, the polyethylene layer is foamed by means of the water in the paper layer, and the solvent components in ink. However, if this method is simply applied to the manufacture of containers, the outer surface of the container will be foamed throughout to become undulated. With such containers, users (who are going to drink the liquid contents) may occasionally feel "grainy" when their lower lip touches the part of a container which is immediately under the brim. To eliminate this unpleasant feeling, the film near the brim of the container is preferably left unfoamed.

There are two methods that can be used to form an unfoamed area in a desired position on the outer surface of the container body. The first method consists of providing at least one continuous or discontinuous slit in a selected area of the film side where foaming is to be effected. The slit is preferably deep enough to penetrate the film to reach the paper. The function of slits is as follows: when water evaporates from within the heated paper, the vapor will escape to the air atmosphere via the slits, thereby preventing the film from being foamed in the area where the slits are cut. The slits may be cut into the paper but not so deep as to reduce the mechanical strength of the container.

Figure 2:
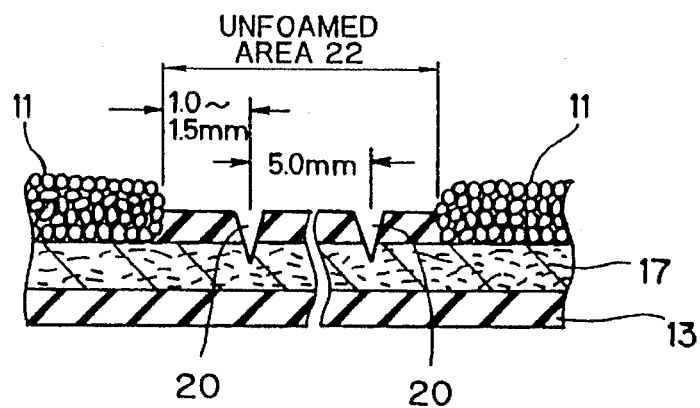
FIG. 2 is a diagrammatic cross section showing how an unfoamed area is formed by cutting slits.

FIG. 2 is a diagrammatic cross section illustrating how the first method is implemented. Providing one slit 20 is effective in assuring that the nearby area will remain unfoamed over a width of ca. 1.0–1.5 mm. Hence, given a single slit, a non-foamed area 22 can be formed over a distance of 1.0–1.5 mm on either side (hence, for an overall width of 2.0–3.0 mm). If two slits are to be cut side by side, the resulting synergistic effect will permit them to be spaced apart on a pitch of 5.0 mm. Hence, as shown in FIG. 2, cutting two slits contributes to the formation of an unfoamed area that has an overall width of 7.0–8.0 mm. This means that an unfoamed area having a width of 15 mm can effectively be formed by cutting three slits. Thus, unfoamed areas of desired widths can be formed by properly selecting the number of slits to be cut.

Figure 3A:
Figures 3B, 3C:
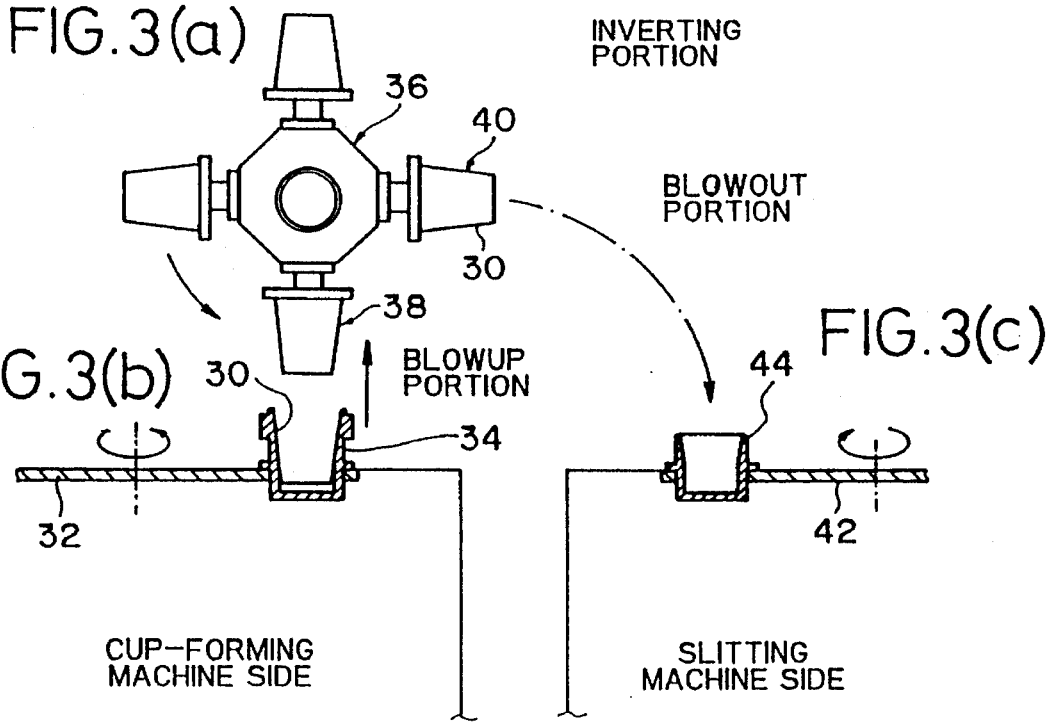

FIG. 3 is a set of diagrams showing schematically a step in the process of producing the container of the invention. A shaped container 30 on the turntable 32 which is a component of a cup-forming machine is transferred to a blowup portion 34 and thence blown up on to the mandrel 38 of an inverting drum 36; thereafter, the container as it is sucked by the mandrel 38 is transferred to a blowout portion 40 and, thence, to another turntable 42 which is a component of a slitting machine. In practical operations, the shaped container 30 is received by a cup holder 44 on the turntable 42 before transfer to a slitting section.

Figure 4:
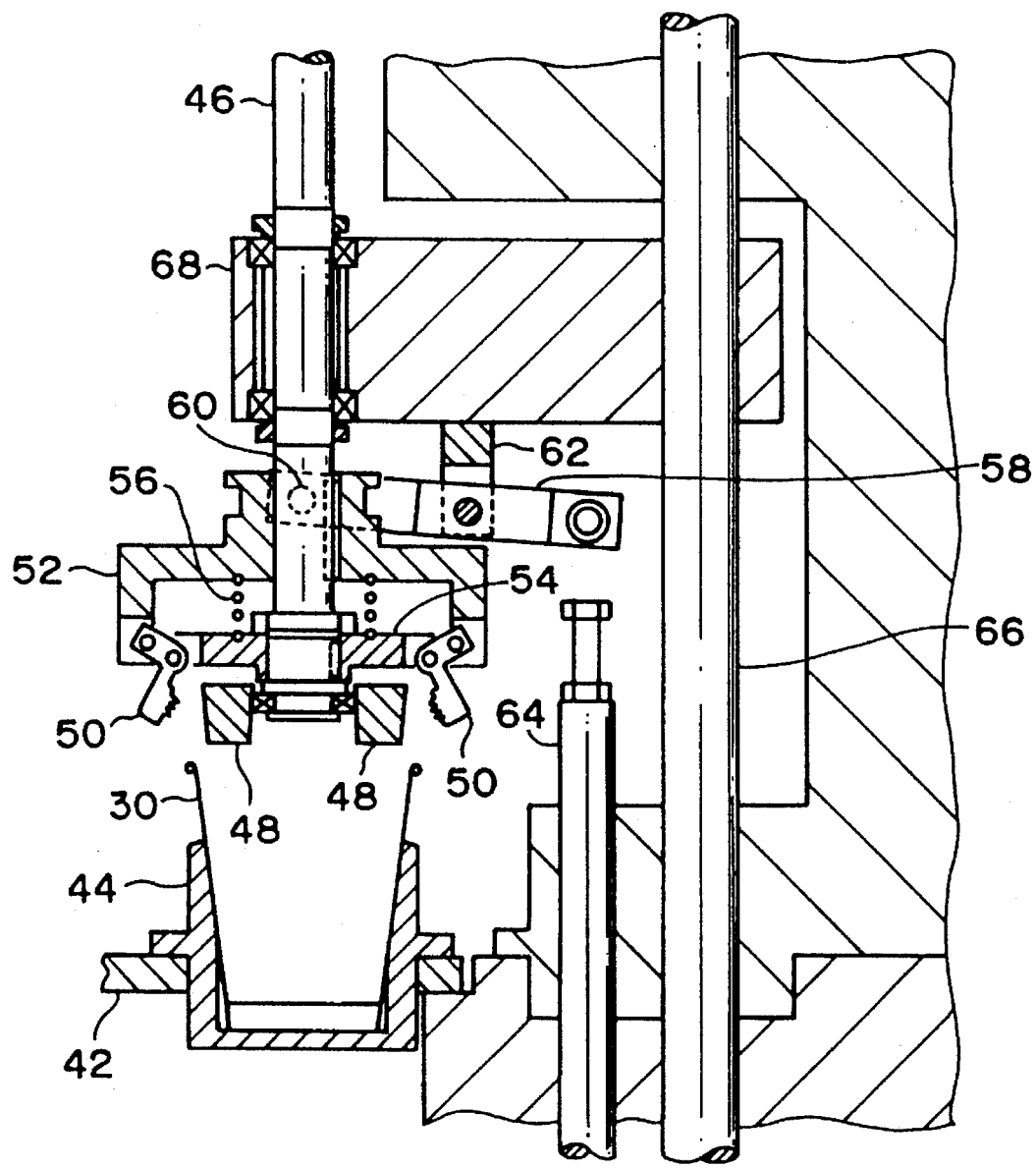
FIG. 4 is a simplified cross section showing the essential part of the slitting machine.

FIG. 4 is a simplified cross section showing the essential part of the slitting section of the slitting machine. A shaft 46 that is driven by a motor (not shown) to keep rotating is fitted with a clamp 48 at the bottom end. The clamp 48 has two claws 50 on the periphery in diametric positions that are each mounted pivotally on a first supporting bracket 52 and a second supporting bracket 54. A spring 56 is interposed between the two supporting brackets 52 and 54. A lever 58 is positioned immediately above the first supporting bracket 52 in engagement therewith via a cam follower 60 in such a way that said bracket is capable of rotating and sliding with respect to the lever 58. The lever 58 is pivotally supported under a mounting bracket 62. A slitting unit composed of the shaft 46, clamp 48, claws 50, lever 58 and other necessary components is supported on a shaft 66 by means of a member 68. Both shafts 64 and 66 are adapted to move vertically by means of cams (not shown).

Figure 5:
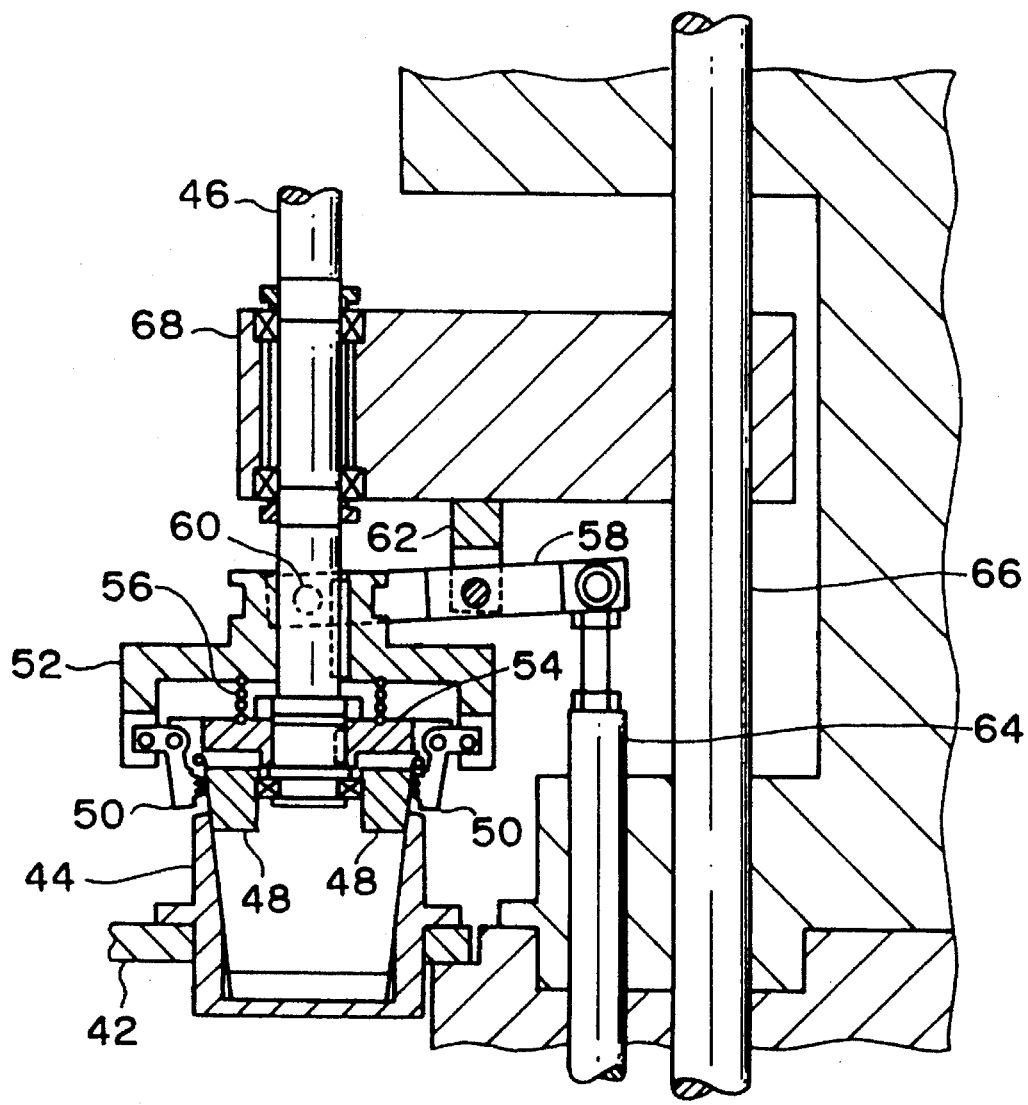
FIG. 5 is a simplified partial cross section showing how slits are cut in the area of a container just under the brim.

FIG. 5 is a simplified cross section showing how slits 20 are cut in an area just beneath the brim of a container 30. As the shaft 66 descends, so does the slitting unit bringing the clamp 48 into engagement with the inner surface of the container 30. A short time before the clamp 48 comes into complete engagement with the inner surface of the container, the shaft 64 ascends and its top contacts the bottom of the right end of the lever 58. As the right end ascends, the left end of the lever which is pivotally supported on the mounting bracket 62 will descend, causing the first supporting bracket 52 to be pushed toward the second supporting bracket 54. As a result, the claws 50 which are each pivotally mounted on the first and second supporting brackets 52 and 54 are moved toward the center of the container and, a short time after the clamp 48 comes into engagement with the inner surface of the container, the rotating claws will cut slits 20 in the inner surface of the area just beneath the brim of the container. When the cutting of the slits 20 ends, the shaft 64 descends and the spring 56 recovered its shape, allowing the claws 50 to return to their initial position. Thereafter, the shaft 66 ascends, causing the clamp 48 to come out of engagement with the inner surface of the container. The primary function of the clamp 48 is to prevent the container 30 from rotating together with the claws 50.

Figure 6:
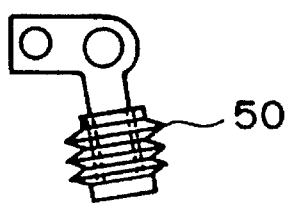
FIG. 6 is a side view showing an example of the claws which are used in cutting slits.

The claws that are shown in FIGS. 4 and 5 have cutting edges on one side. Alternatively, claws of a roller type which are supported rotatably as shown in FIG. 6 may be employed. Claws of the roller type shown in FIG. 6 are capable of efficient cutting of continuous slits. If discontinuous slits are to be cut, the cutting ridges on the roller may be rendered discontinuous.

Cutting slits in the area just beneath the brim of the container will in no way affect its inherent strength. In an experiment with containers that had varying numbers of slits cut in the area between the brim and the point 10 mm below, it was verified that satisfactory practical strength was insured when the slits were not cut deep into the paper layer. Three kinds of samples were prepared; the first type had two slits cut; the second type had three slits cut; the third was a control having no slits cut. Twelve samples were prepared for each type. The control samples had an average cup rigidity of 405.08 gf whereas the samples with two slits had an average cup rigidity of 401.83 gf and the samples with three slits had an average cup rigidity of 395.42 gf. As for the average buckling strength, the respective values were 45.15 kgf, 30.02 kgf, and 28.43 kgf. These data show that cutting two or three slits in the area just beneath the brim of a container will in no way affect its practical strength and that it will serve the intended purpose.

Figure 7:
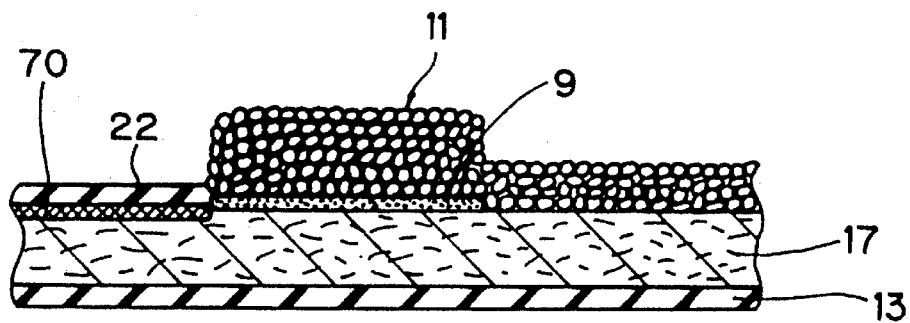
FIG. 7 is a diagrammatic cross section showing how an unfoamed area is formed by applying a coating material onto the surface of the paper to ensure against the evaporation of water from the paper.
Figure 8:
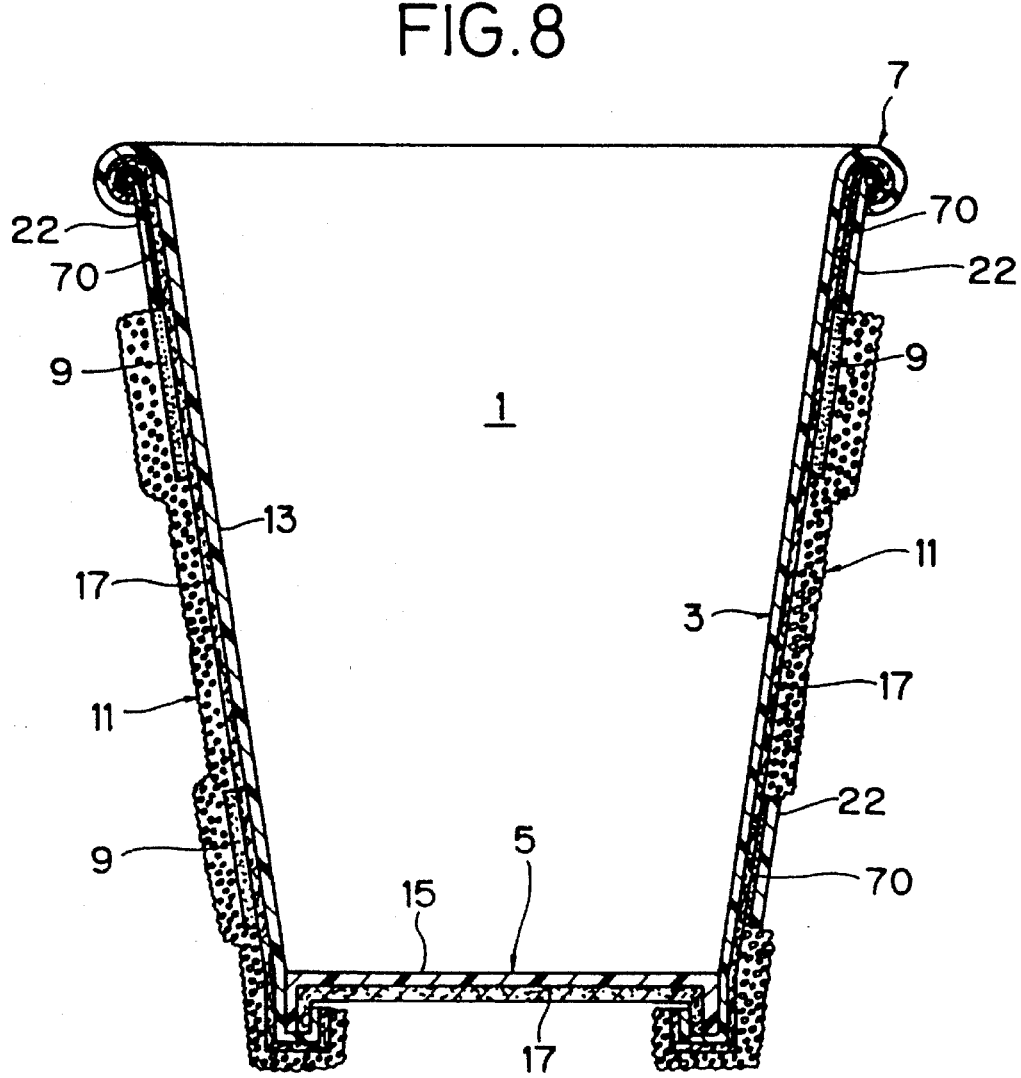
FIG. 8 is a simplified cross section showing a heat-insulating paper container having unfoamed areas in accordance with the invention.

The second method for providing an unfoamed area in desired positions on the outer surface of the container body is to insure that the water in the paper and the solvent components of ink will not evaporate from the paper. A specific way to implement this method is by coating a specified width of an anti-evaporation layer in an area beneath the brim of the container, as shown in FIG. 7. The film lying above an anti-evaporation layer 70 coated on the paper surface 17 will not foam at all and retains its initial thickness. On the other hand, the film lying in areas where no such anti-evaporation layer is applied is foamed by the water in the paper to form a foamed heat insulating layer 11. The foaming action is particularly great in the film lying above the printed layer 9 since the solvents in the latter will accelerate foaming. FIG. 8 is a simplified cross section of a heat-insulating paper container that has unfoamed areas 22 formed by the second method in accordance with the present invention. The unfoamed areas 22 may be provided as continuous bands that surround an area beneath the brim of the container as shown in FIG. 8. Alternatively, they may be discontinuous bands that are provided in selected positions on the outer surface of the container.

The anti-evaporation layer is desirably formed of a water-vapor impermeable layer that is capable of efficient film formation to prevent the evaporation of water from within the paper. Preferred examples are aqueous coating materials such as KREHALONTEX DO-818 of Kureha Chemical Industry Co., Ltd. and CLEARCOAT LA723-B1 of Hoechst Gosei K.K.

It is generally preferred that the coating materials are applied in weights ranging from 2 to 12 $g/m^2$ on a dry basis, which corresponds to the range from 6 to 30 $g/m^2$ on a wet basis. Coating weights range more preferably from 3 to 4 $g/m^2$ on a dry basis.

The method of applying the coating materials is not limited in any particular way. A suitable method of application may be selected as appropriate to the viscosity of the coating material used. Highly viscous coating materials can be applied by printing methods such as flexography and offset printing or by roll coating, whereas less viscous coating materials are preferably applied by gravure printing.

In principle, the anti-evaporation layer may be formed in superposition on the printed layer. In practice, however, consisting application of the anti-evaporation layer sometimes becomes difficult if the printed layer uses an oil-based ink. To void this problem, printed layers are desirably not provided in positions where the unfoamed layer is to be formed.

As in the case of cutting slits in accordance with the first approach, the anti-evaporation layer is desirably coated within an area that ranges from the brim of the container to the point about 15 mm below. If the anti-evaporation layer is to be applied on a printing press, a patterned plate may be used to insure that the layer is selectively applied in desired positions. A gravure plate can also be used and this offers the advantage of freely adjusting the weight of application by proper settings of cell depth; as a consequence, it becomes possible to control the degree by which evaporation of water from within the paper is retarded.

The process of manufacturing containers involving the step of forming an unfoamed area in desired portions on the outer surface of the container body by the second method described above comprises the steps of forming printed layers on a paper sheet as an anti-evaporation layer is coated simultaneously, then laminating the paper sheet with a thermoplastic resin film, blanking a body member from the thus laminated paper sheet, fabricating the body member together with a separately provided bottom panel member into a container shape, and subjecting it to a heat treatment. The thus produced container has the resin film laminated foamed in desired positions. The unfoamed areas that can be formed by the second method are not restricted to the area just beneath the brim of the container. In other words, the second method enables a foamed heat-insulating layer to be selectively formed in a position that is most likely to be held by the user while the other part of the container is in such a state that the smooth appearance of the unfoamed film lamination is retained.

The major advantage of the second approach is that it does not require any special equipment or step that are indispensable to the first approach which relies upon the cutting of slits; hence, the manufacturing cost of containers can be reduced without compromising their mechanical strength at all.

As typically disclosed in Unexamined Published Japanese Patent Application (kokai) Hei 6-99967, various foaming techniques have so far been proposed. However, they are solely related to the foaming operation per se and no methods have heretofore been proposed that are capable of foaming resins in a controlled manner. According to the second approach described above, not only foamed areas but also unfoamed areas can freely be formed in desired positions and locations and, hence, the latitude in the design of containers is increased and, in addition, this approach can be effectively used in producing containers that have important printed areas (such as bar codes) that should not be foamed.

The following example is provided for the purpose of further illustrating the advantages of the heat-insulating container of the invention but is in no way to be taken as limiting.

EXAMPLE 1

A paper sheet having a basis weight of 230 g/m$^2$ (water content: 7.9%) was printed on one side in selected areas with an ink containing a mixed solvent of methyl isobutyl ketone, methyl ethyl ketone and toluene, an inorganic pigment having a particle size of 0.5 μm, and a vinyl chloride resin. The residual amount of solvents in the printed areas was 5×10$^{-5}$ g/m$^2$. The paper sheet was then extrusion-laminated with a low-density polyethylene in a thickness of 40 μm. The other side of the paper sheet was extrusion-laminated with a high-density polyethylene in a thickness of 20 μm.

Another paper sheet was extrusion-laminated on one side with a medium-density polyethylene in a thickness of 18 μm.

A container body member was blanked out of the paper sheet that had been subjected to printing, and a bottom panel member was blanked out of the other paper sheet. The two blanks were fabricated into a container on a cup-forming machine. The body member of the container had a total thickness of 0.31 mm (including the paper and the film lamination). The paper container thus fabricated was put into a conveyor oven and heated at 120° C. for 120 sec. A foamed heat-insulating layer was formed only on the outer surface of the container body. The foamed heat-insulating layer in the printed areas had a thickness of about 0.96 mm whereas the foamed heat-insulating layer in the non-printed areas had a thickness of about 0.68 mm.

As a control, a paper container was prepared that was not subjected to heat treatment and which hence had none of foamed heat-insulating layers.

Figure 9:
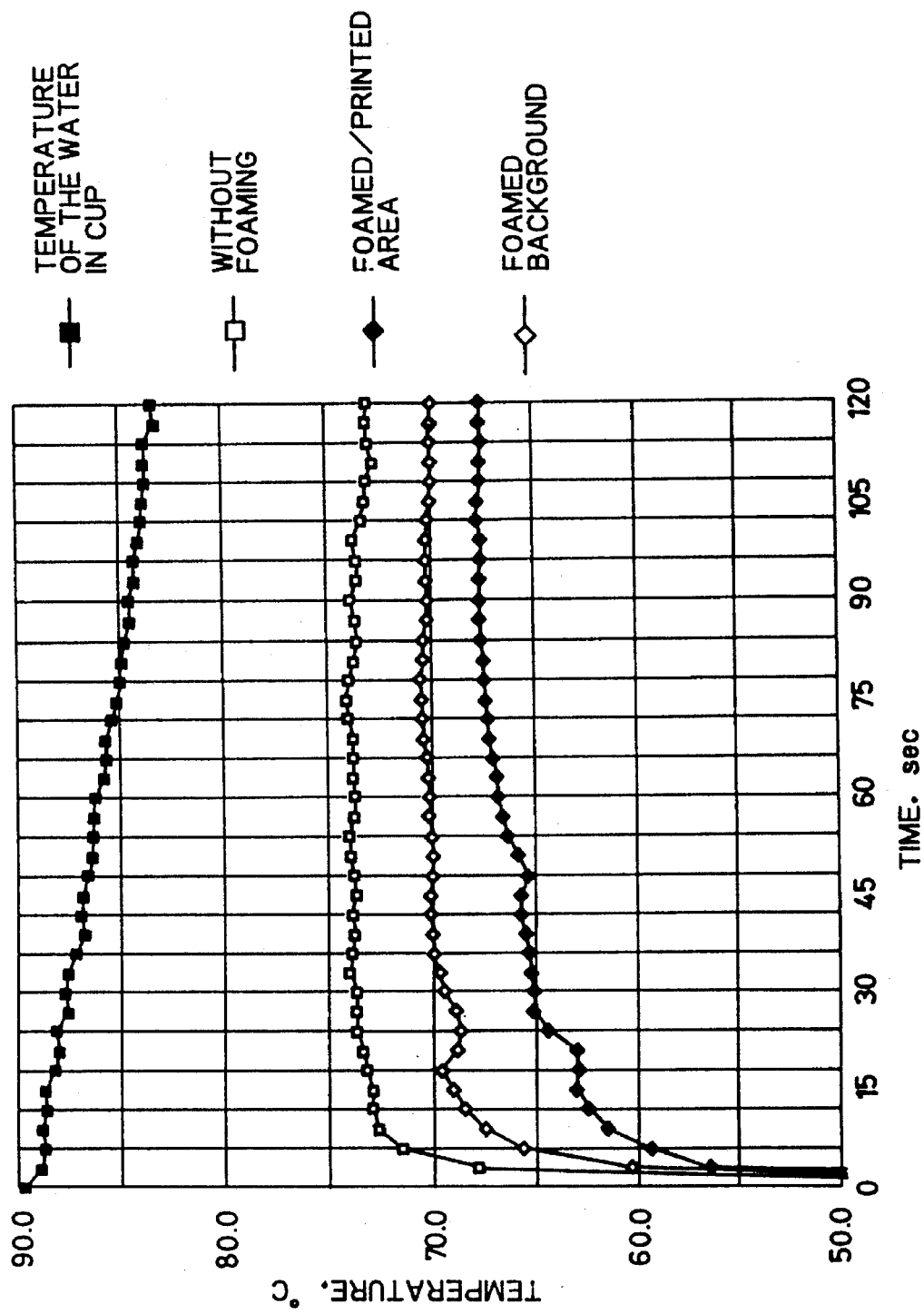
FIG. 9 is a characteristic graph demonstrating the heat-insulating performance of the container shown in FIG. 1.

Hot water (90° C.) was poured into the two containers and temperature was measured on the outer surface of the container body. The results are shown in FIG. 9. Obviously, the temperature difference between the foamed/printed areas and the foamed background was as great as about 7° C. immediately after pouring the hot water. Even after the lapse of 120 seconds, the temperature difference between the two areas was still no less than about 2.5° C., demonstrating continued satisfactory heat-insulating performance. When containers filled with hot water were held by hand, the difference in hotness as sensed subjectively was greater than what was indicated by the measured numeric data. This would be due to the combined effect of the following two phenomena: the fine asperities on the surface of the foamed heat-insulating layers contributed to reduce the area of contact with hand significantly; and the slightest increase in the thickness of the foamed heat-insulating layers helped reduce the heat transfer to hand.

As described on the foregoing pages, the heat-insulating paper container of the invention is characterized in that printing its applied to selected areas of the body member and that the printed areas are laminated with a thermoplastic synthetic resin film. Upon subsequent heat treatment, the resin film in the printed areas is foamed by a greater degree than the film in the non-printed areas to form thick heat-insulating layers.

In the printed areas, the thermoplastic synthetic resin (in particular, polyethylene) and the paper are bonded by means of the ink layer (more exactly, the resin in the ink) present between the polyethylene and the paper. Upon heat treatment, the resin in the ink softens and the force of bond between the paper and the polyethylene becomes weak and not only the water in the paper but also the residual solvent components in the printed areas will evaporate to induce intense foaming from within the polyethylene layer, thereby producing a comparatively thick air foam layer within the polyethylene layer. Upon subsequent cooling, the polyethylene which is a thermoplastic resin will solidify to confine the thick air foam layer. As a result, the polyethylene film in areas corresponding to the printed areas has a greater overall thickness than the film in areas corresponding to the non-printed areas, thereby assuring outstanding heat insulation.

According to the present invention, cup manufacturers can selectively apply printing to areas that are most likely to be held by users and this enables the production of cups that are specifically adapted to be capable of efficient heat insulation in those areas. Thus, paper containers having excellent heat-insulating performance can be manufactured at low cost. As a further advantage, the container of the invention which is generally made of paper will contribute a lot to the saving of petroleum resources and, at the same time, waste containers can be disposed of by incineration without damaging incinerators since they will generate less heat of combustion.

The invention offers still another advantage in that an unfoamed area can be formed in positions such as beneath the brim of the container which are to be contacted by the lower lip of users or in any other desired positions.

What is claimed is:

1. A heat-insulating paper container comprising a body member and a bottom panel member, an area of the outer surface of said body member being provided with printing of an organic solvent based ink, wherein a thick foamed heat-insulating layer that is made of a thermoplastic synthetic resin film is formed in the printed area of said outer surface whereas a less thick foamed heat-insulating layer that is made of the same thermoplastic synthetic resin film is formed in the non-printed area of said outer surface.

2. A container according to claim 1 wherein said thick foamed heat-insulating layer is formed in the upper half of the body member in an area near the brim.

3. A container according to claim 1 wherein at least the inner surface of the body member is laminated with one of a thermoplastic synthetic resin film having a higher softening point than the thermoplastic synthetic resin film laminated on the outer surface of the body member and with an aluminum foil.

4. A process for producing a heat-insulating paper container comprising the steps of providing a body member and a bottom panel member, applying printing to an area of the outer surface of said body member with an organic solvent based ink, covering all outer surfaces of said body member including the printed area with a thermoplastic synthetic resin film, fabricating the thus treated body member and the bottom panel member into a container, heating the container so that said thermoplastic synthetic resin film is foamed, thereby forming a thick foamed heat-insulating layer in the area of the outer surface of said body member which has been printed with the organic solvent based ink and forming a less thick foamed heat-insulating layer in the non-printed area of the outer surface of said body member.

5. A process according to claim 4 wherein said thick foamed heat-insulating layer is formed in the upper half of the body member in an area near the brim.

6. A process according to claim 4 wherein at least the inner surface of the body member is laminated with one of a thermoplastic synthetic resin film having a higher softening point than the thermoplastic synthetic resin film laminated on the outer surface of the body member and with an aluminum foil.

7. A heat-insulating paper container comprising a body member and a bottom panel member, an area of the outer surface of said body member being provided with printing of an organic solvent based ink, wherein a thick foamed heat-insulating layer that is made of a thermoplastic synthetic resin film is formed in the printed area of said outer surface whereas a less thick foamed heat-insulating layer that is made of the same thermoplastic synthetic resin film is formed in the non-printed area of said outer surface, said thermoplastic synthetic resin film remaining unfoamed in at least part of the outer surface of said body member.

8. A heat-insulating paper container according to claim 7 wherein said unfoamed area is formed as a continuous band of a specified width that surrounds an area just below the brim of the container.

9. A container according to claim 7 wherein said thick foamed heat-insulating layer is formed in the upper half of the body member in an area near the brim.

10. A container according to claim 7 wherein at least the inner surface of the body member is laminated with one of a thermoplastic synthetic resin film having a higher softening point than the thermoplastic synthetic resin film laminated on the outer surface of the body member and with an aluminum foil.

11. A process for producing a heat-insulating paper container comprising the steps of providing a body member and a bottom panel member, applying printing to an area of the outer surface of said body member with an organic solvent based ink, covering all outer surfaces of said body member including the printed area with a thermoplastic synthetic resin film, fabricating the thus treated body member and the bottom panel member into a container, cutting at least one continuous or discontinuous slit in at least part of said thermoplastic synthetic resin film, and subsequently heating the container so that said thermoplastic synthetic resin film is foamed, thereby forming a thick foamed heat-insulating layer in the area of the outer surface of said body member which has been printed with the organic solvent based ink and forming a less thick foamed heat-insulating layer in the non-printed area of the outer surface of said body member, said thermoplastic synthetic resin film remaining unfoamed on both sides of the area where said slit has been cut.

12. A process according to claim 11 wherein at least one of a continuous and discontinuous slit is cut in an area just below the brim of the container so that upon heating of the container, an unfoamed area of a specified width is formed as a continuous band on both sides of the area where said slit has been cut.

13. A process for producing a heat-insulating paper container comprising the steps of printing a desired pattern on one side of a paper sheet as a coating material is simultaneously applied in one of a pattern and partly on to a desired area of the same side of the paper sheet, laminating the same side of the paper sheet with a thermoplastic synthetic resin film, blanking a body member from said paper sheet, blanking a bottom panel member from another paper sheet, fabricating the two members into a container, heating the container so that the thermoplastic synthetic resin film is foamed, thereby forming a thick foamed heat-insulating layer in the area of the outer surface of said body member which has been printed with the organic solvent based ink and forming a less thick foamed heat-insulating layer in the non-printed area of the outer surface of said body member, said thermoplastic resin film remaining unfoamed in the part of the outer surface that corresponds to the area where said coating material has been applied.

14. A process according to claim 13 wherein said coating material is a water-vapor impermeable material that is capable of efficient film formation to prevent the evaporation of water from within the paper.

15. A process according to claim 13 wherein the side of the paper sheet for making the body member that is to provide the inner surface of the container is laminated either with a thermoplastic synthetic resin film having a higher softening point than the thermoplastic synthetic resin film that is to be laminated on the other side which is to provide the outer surface of the container or with an aluminum foil.

* * * * *